US008332441B2

(12) United States Patent
Aurora

(10) Patent No.: US 8,332,441 B2
(45) Date of Patent: Dec. 11, 2012

(54) MECHANISM FOR UNIONING FILE SYSTEMS USING FALL-THROUGH DIRECTORY ENTRIES

(75) Inventor: Valerie Anita Aurora, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 12/724,944

(22) Filed: Mar. 16, 2010

(65) Prior Publication Data
US 2011/0231370 A1 Sep. 22, 2011

(51) Int. Cl.
*G06F 12/00* (2006.01)
*G06F 17/30* (2006.01)
(52) U.S. Cl. .................. 707/821; 707/828; 707/831
(58) Field of Classification Search ........... 707/999.002, 707/999.201, 692, 782, 821, 828, 831
See application file for complete search history.

(56) References Cited

U.S. PATENT DOCUMENTS

| 5,870,737 | A * | 2/1999 | Dockter et al. ............. 706/48 |
| 7,047,257 | B2 * | 5/2006 | Fletcher et al. ........ 707/999.201 |
| 7,610,329 | B2 * | 10/2009 | Bone et al. ............ 707/999.002 |
| 7,650,341 | B1 * | 1/2010 | Oratovsky et al. ....... 707/999.01 |
| 7,685,088 | B2 * | 3/2010 | Zhang et al. .................... 706/61 |

OTHER PUBLICATIONS

Aurora, Valerie, "Union file systems: Implementations, part I", LWN.net, Mar. 25, 2009, pp. 1-8.
Aurora, Valerie, "Union file systems: Implementations, part 2", LWN.net, Apr. 7, 2009, pp. 1-5.
Aurora, Valerie, "Union file systems: Architecture, features, and design choices", LWN.net, Mar. 18, 2009, pp. 1-13.
Corbet, "Union mount workshop notes", Union Mount Workshop: Review of Existing Approaches, posted Mar. 24, 2009, 7 pgs.
Rao, Bharata B., "Union Mount VFS based File System Namespace Unification for Linux", IBM Linux Technology Center, Dec. 2007, 25 pgs.
Braam, Peter J., "Linux Virtual File System", 32 pgs.

* cited by examiner

*Primary Examiner* — Vincent Boccio
(74) *Attorney, Agent, or Firm* — Lowenstein Sandler PC

(57) ABSTRACT

A mechanism for unioning file systems using fall-through directory entries is disclosed. A method of embodiments of the invention includes receiving a request to open a directory of a union file system, processing directory entries of the directory for whiteouts and duplicates, copying the processed directory entries to disk storage, and flagging the copied entries from a lower level file system as fall-through entries.

20 Claims, 4 Drawing Sheets

MECHANISM FOR UNIONING FILE SYSTEMS USING FALL-THROUGH DIRECTORY ENTRIES

TECHNICAL FIELD

The embodiments of the invention relate generally to file systems and, more specifically, relate to a mechanism for unioning file systems using fall-through directory entries.

BACKGROUND

A unioning file system combines the namespaces of two or more file systems together to produce a single merged namespace. This is useful for things like a live CD/DVD: one can union-mount a small, writeable file system on top of a read-only DVD file system and have a usable system without needing to transfer the system from the DVD to the root file system. Another use is to export single read-only base file systems via a network file system (NFS) protocol to multiple clients, each with their own small writeable overlay file system union mounted on top.

Union file systems are inherently difficult to implement for a variety of reasons. However, much of the complexity comes from solving the following problems: whiteouts, readdir( ) support, stable inode numbers, and concurrent modifications to more than one branch at a time. For instance, with respect to readdir( ) support, readdir( ) is an operation that occurs when listing files in a directory, such as when you open a folder in the directory. Generally, the main problem with readdir( ) in operation is that it is unknown beforehand how many directory entries there are in the directory. As a result, only a few entries in the directory are read in at a time in order to conserve memory. A "bookmark" is utilized to mark the location where the readdir( ) operation paused and needs to pick back up again on the next read. Typically, this "bookmark" is an identifier of the location in the directory the readdir( ) operation stopped and is specific to each file system. In the realm of unioning file systems, where namespaces are merged, an issue arises with readdir( ) because there are two directories with entries that are listed for one unioned file system, but only one "bookmark" is returned. There is no standard for the "bookmark" between file systems, so the bookmark loses its relevance.

One example of a problem with some current implementations of readdir( ) is that they occur in the kernel. The "bookmark" field is set to the offset within the current underlying directory, minus the sizes of the previous directories. Directory entries from directories underneath the top layer must be checked against previous entries for duplicates or whiteouts. As currently implemented, each readdir( ) system call reads all of the previous directory entries into an in-kernel cache, then compares each entry to be returned with those already in the cache before copying it to the user buffer. The end result is that readdir( ) is complex, slow, and potentially allocates a great deal of kernel memory. Implementations that use application memory rather than kernel memory to cache directory entries have similar unacceptable costs in memory and processing time This is just one example of the complexities resulting from unioning file systems, and other problems also arise such as optimizing whiteouts, providing stable inode numbers, and dealing with concurrent modifications. As such, a solution to reduce the complexity of union file systems by streamlining the problems with such systems would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
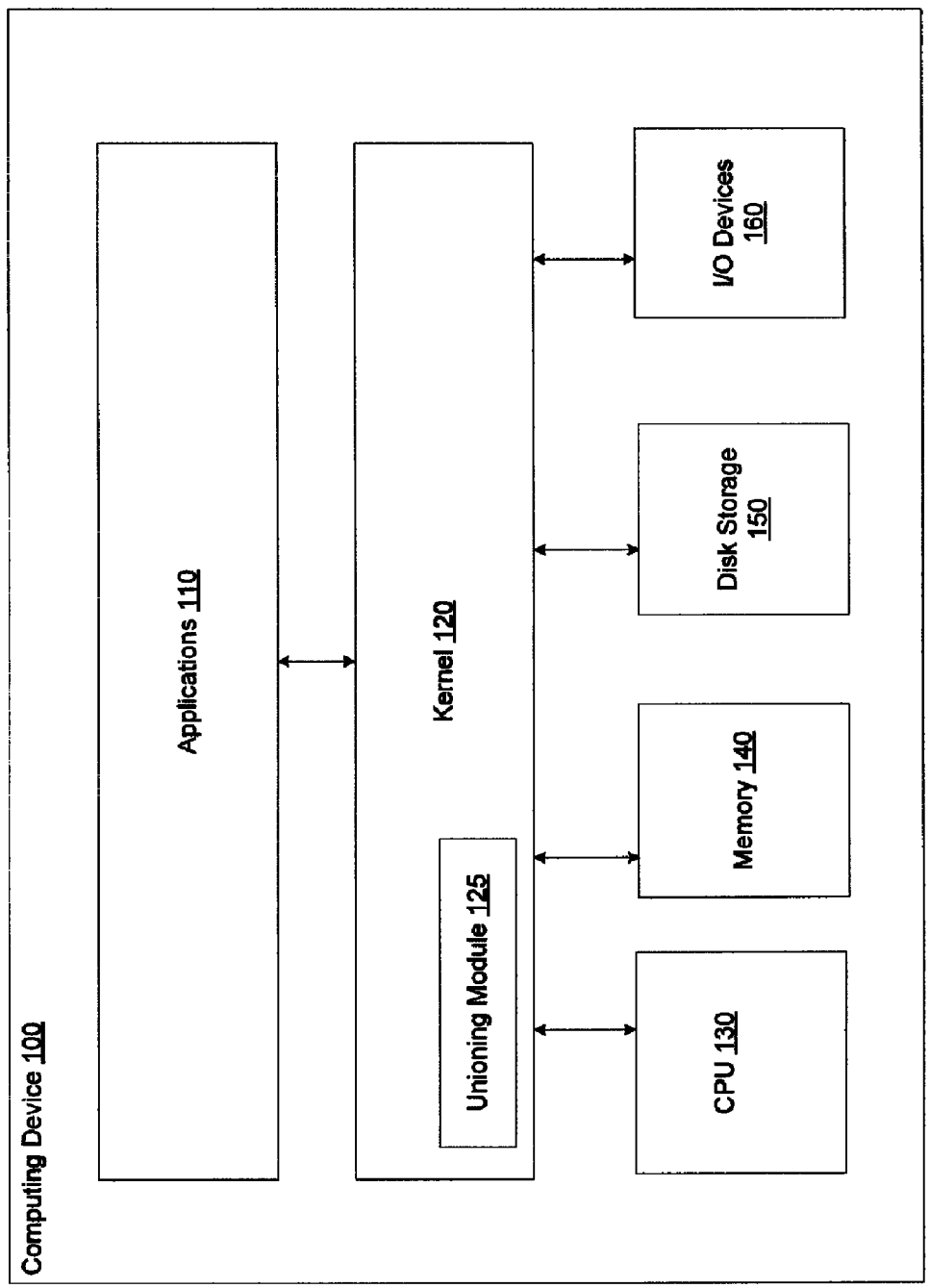
FIG. 1 is a block diagram of a computing device capable of implementing embodiments of the invention.

Embodiments of the invention provide a mechanism for unioning file systems using fall-through directory entries. A method of embodiments of the invention includes receiving a request to open a directory of a union file system, processing directory entries of the directory for whiteouts and duplicates, copying the processed directory entries to disk storage, and flagging any copied entries from a lower level file system as fall-through entries.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "processing", "copying", "flagging", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for unioning file systems using fall-through directory entries. Embodiments of the invention proactively copy up not just directory entries for directories, but all of the directory entries (i.e., directories and files) from lower file systems, process duplicates and whiteouts, make the directory opaque, and write it out to disk. In effect, embodiments of the invention process the directory entries for whiteouts and duplicates on the first open of the directory, and then write the resulting "cache" of directory entries to disk. The directory entries pointing to files on the underlying file systems need to signify somehow that they are "fall-through" entries that explicitly require looking up an object in the lower file system.

FIG. 1 is a block diagram of a computing device 100 capable of implementing embodiments of the invention. Computing device 100 includes one or more applications 100, a kernel 120 that is a key component of an OS (not shown) of computing device 100, a CPU 130, memory 140, disk storage 150, and I/O devices 160.

The kernel 120 is the central component of most OSs, as it is a bridge between the applications 110 and the actual data processing done at the hardware level 130-150. The kernel's 120 responsibilities include managing the system's resources (the communication between hardware and software components). The kernel 120 can provide the lowest-level abstraction layer for the resources (especially processors 130 and I/O devices 150) that application software 110 should control to perform its function. It typically makes these facilities 130-160 available to application processes 110 through inter-process communication mechanisms and system calls.

In embodiments of the invention, as illustrated, kernel 120 includes a unioning module 125. Unioning module 125 provides the processing logic to implement union file systems and/or union mounts in computing device 100. Specifically, unioning module 125 combines the namespaces of two or more file systems together to produce a single merged namespace. In embodiments of the invention, unioning module 125 operates to proactively copy up not just directory entries for directories, but all (or substantially all in some embodiments) of the directory entries (i.e., directories and files) from lower file systems, process duplicates and whiteouts, make the directory opaque, and write it out to disk storage 150. In effect, embodiments of the invention process the directory entries for whiteouts and duplicates on the first open of the directory, and then write the resulting "cache" of directory entries to disk.

Figure 2:
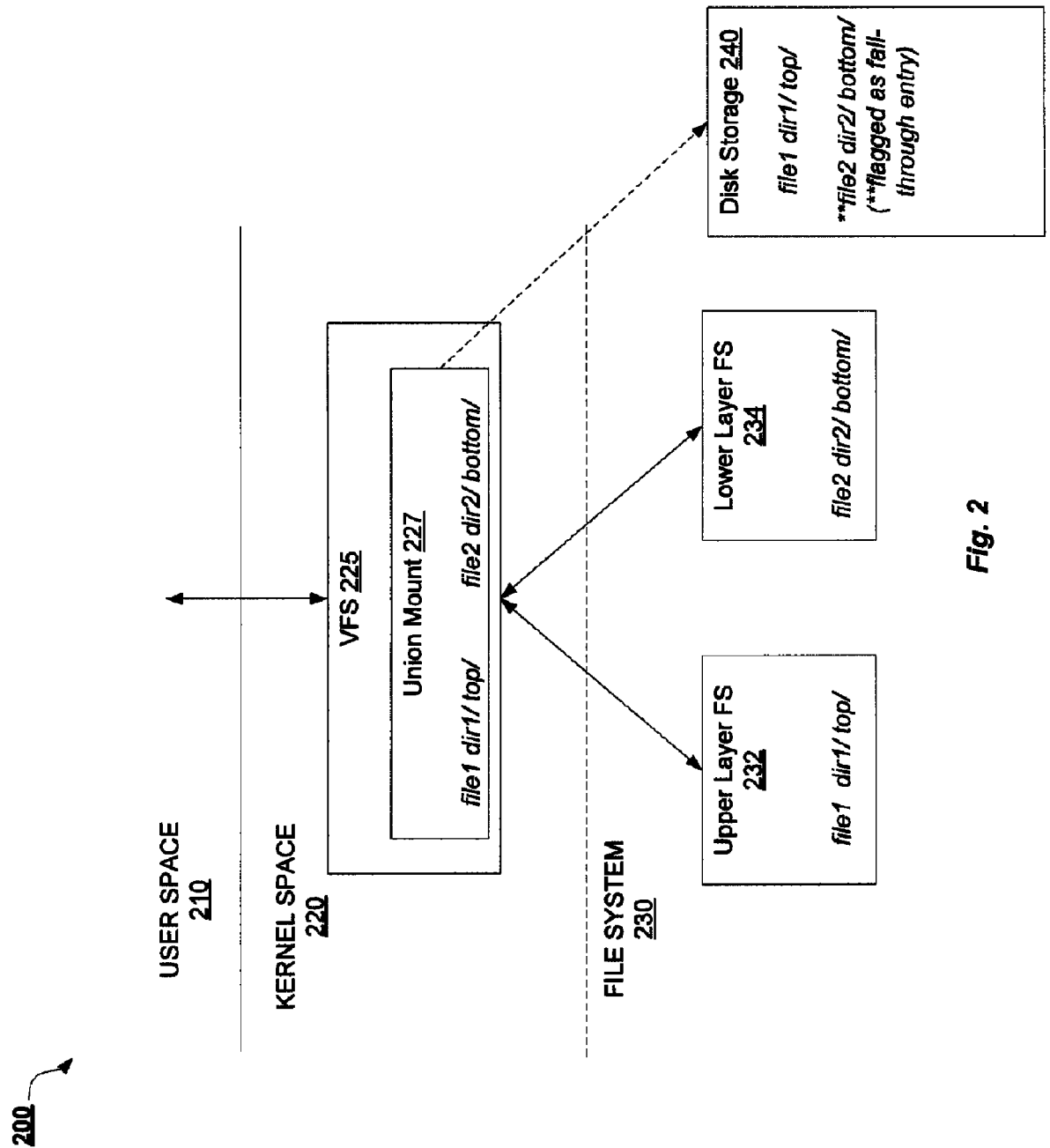
FIG. 2 is a block diagram of another view of a computing device configured to perform embodiments of the invention.

FIG. 2 is a block diagram of another view of a computing device 200 configured to perform embodiments of the invention. In one embodiment, computing device 200 is the same as computing device 100 described with respect to FIG. 1. As illustrated, computing device 200 includes a detailed view of various OS spaces, such as user space 210 and kernel space 220. Also illustrated is the interaction of the OS spaces with the file system 230 and disk storage 240 of computing device 200.

File system 230 includes two file systems, an upper file system 232 and a lower file system 234 that are merged together as a single virtual file system 225 via a union mount 227. Generally, the lower files system 234 is mounted into the single merged namespace as read-only, while the upper file system 232 is the file system that is mounted into the single merged namespace read-write as an overlay on top of the lower file system 234. The overlay should persistently store changes and allow arbitrary manipulation of the combined namespace. In should be noted that embodiments of the invention may apply to a union of more than 2 layers of files systems.

Each file system may include one or more directories. Each directory may include files and/or other directories. For instance, upper file system 232 includes a file1 located in a dir1 and lower file system 234 includes a file2 located in a dir2. When the upper and lower file systems 232, 234 are merged together into a single file system in union mount 227, these two files belong to the same file system.

Each time a directory is opened in embodiments of the invention, a copy up to disk storage 240 occurs, basically creating a cached version of the directory in disk storage 240. Embodiments of the invention are configured so that the kernel 220 is responsible for writing the directory entries, including both directory and file entries, out to disk storage 240, rather than to application memory inside the kernel. In some embodiment, the disk storage 240 may be the same as the disk storage holding the upper file system 232. Embodiments of the invention save resources by having the directory copy up operation occur just once, rather than multiple times. Once a directory entry has been copied up, it is marked as opaque in order to distinguish the entries that have been written from those that have not. An opaque directory does not allow the namespace from the lower branches to show through from that point downwards in the namespace.

In embodiments of the invention, the directory entries pointing to files on the underlying lower file system 234 need to signify somehow that they are "fall-through" entries that explicitly require looking up an object in the lower file system 234. One problem that needs to be solved with this approach is how to represent directory entries pointing to lower file systems. A number of solutions present themselves: the entry could point to a reserved inode number, the file system could allocate an inode for each entry but mark it with a new S_LOOKOVERTHERE inode attribute, it could create a symlink to a reserved target, etc. This approach would use more space on the overlying file system, but all other approaches require allocating the same space in memory, and generally memory is more valuable than disk space.

In addition, if "fall-through" directories are implemented by allocating an inode for each directory entry on underlying file systems, then stable inode numbers will be a natural side effect. Another option is to store a persistent inode map somewhere, such as in a file in the top-level directory, or in an external file system, for example.

Furthermore, embodiments of the invention solve the readdir( ) operation issue by being able to utilize a single bookmark system for all the entries copied up into a single file system of the disk storage space. In some embodiments, this bookmark is referred to as a "cookie" or a "d_off field." When the files and directory entries of a directory are copied up in embodiments of the invention, the bookmark may be generated and allocated at that time, or the bookmark indicator may be generated on-the-fly as the directory readdir( ) operations is occurring.

Figure 3:
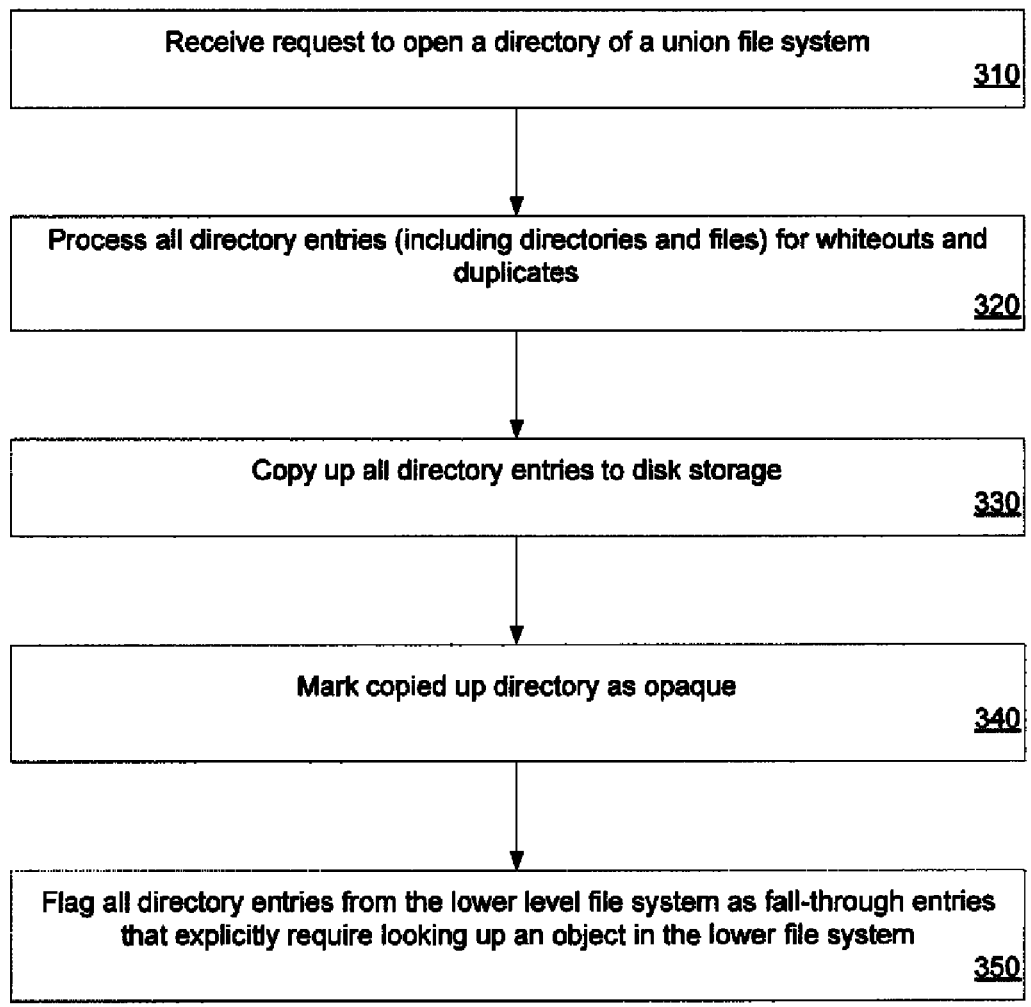
FIG. 3 is a flow diagram illustrating a method for unioning file systems using fall-through directory entries according to an embodiment of the invention.

FIG. 3 is a flow diagram illustrating a method 300 for unioning file systems using fall-through directory entries according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by unioning module 125 of computing device 100 described with respect to FIG. 1.

Method 300 begins at block 310 where a request to open a directory of a union file system is received. In one embodiment the union file system may be a union mount in a virtual file system of the computing device. In other embodiments a union file system other than a union mount may be utilized. At block 320, all directory entries, including directories and files, of the requested directory to open are processed for whiteout and duplicates. Whiteouts are directory entries that cover up all entries of a particular name from lower file system branches. Duplicates are those entries that are identical and are found in both the upper and lower file systems.

Subsequently, at block 330, all of the directory entries are then copied up to disk storage. In one embodiment, this disk storage is the same storage holding the upper file system. In other embodiments, separate disk storage may be utilized. The key here is that valuable memory space in the kernel or application is not required for this process. At block 340, the copied up directory is marked as opaque. An opaque directory does not allow the namespace from the lower branches to show through form that point downwards in the namespace.

Finally, at block 350, all directory entries from the lower level file system are flagged as a fall-through entry. In embodiments of the invention, fall-through entries explicitly require looking up an object in the lower file system. Flagging an entry as a fall-through entry may be accomplished by any number of means. For instance, the entry could point to a reserved inode number, the file system could allocate an inode for each entry but mark it with a new S_LOOKOVERTHERE inode attribute, a symlink may be created to a reserved target, and so on.

Figure 4:
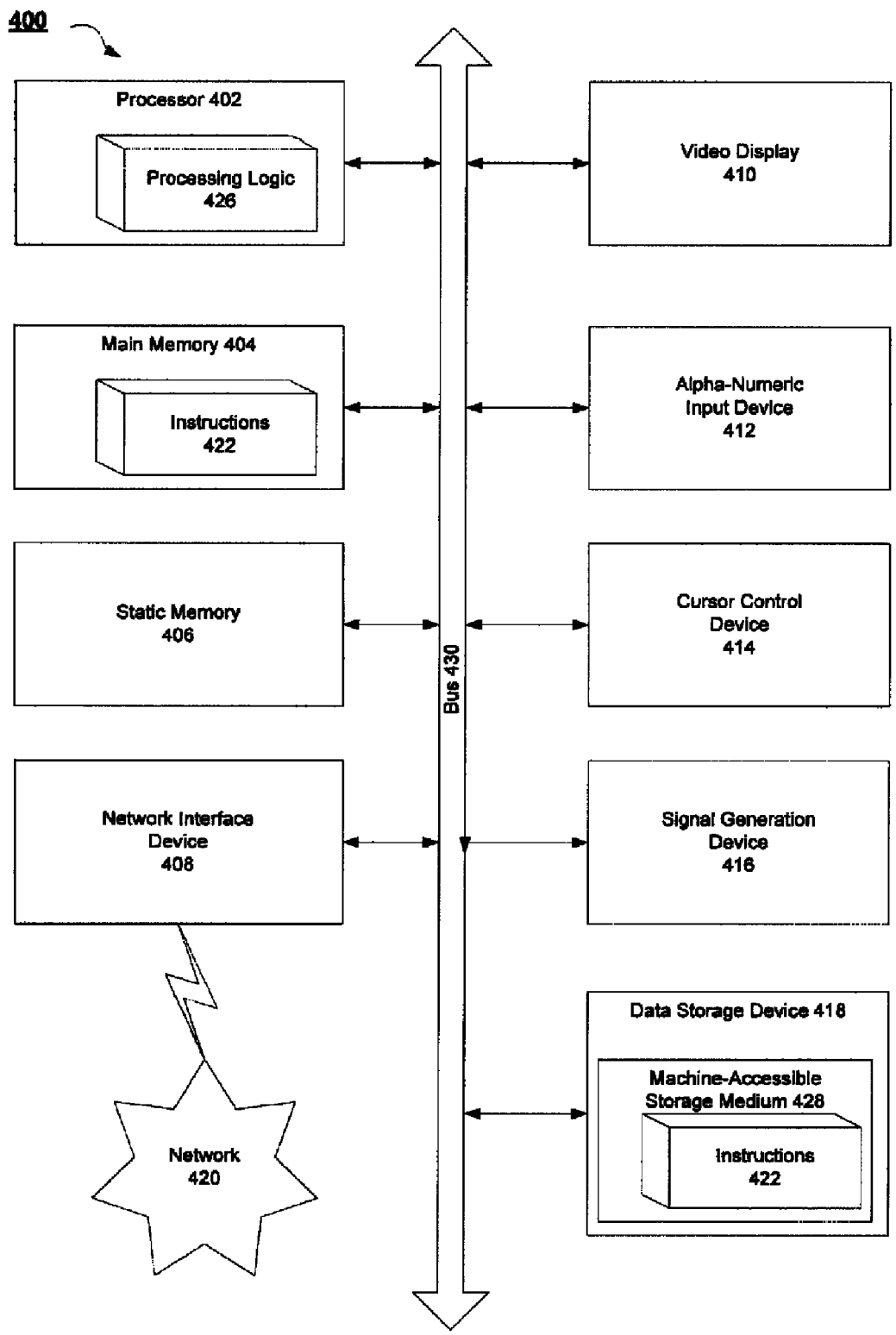
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform unioning file systems using fall-through directory entries by unioning module 125 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform method 300 for unioning file systems using fall-through directory entries described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   receiving, by a unioning module, a request to open a directory of a union file system that merges a lower level file system and an upper level file system;
   processing, by the unioning module executable by a computing device, a plurality of directory entries in at least one of the lower level file system and the upper level file system that correspond to the directory, the plurality of directory entries processed for whiteouts and duplicates between the lower level file system and the upper level file system;
   writing, by the unioning module, the processed plurality of directory entries to disk storage for the union file system, the disk storage separate from kernel memory and application memory of the computing device; and
   flagging, by the unioning module, directory entries from the lower level file system that correspond to any of the processed plurality of directory entries written to the disk storage as fall-through entries.

2. The method of claim 1, further comprising marking a directory of the upper level file system having the processed plurality of directory entries that were written to the disk storage of the union file system as opaque.

3. The method of claim 2, wherein the disk storage is the same storage holding the upper level file system of the union file system.

4. The method of claim 1, wherein the union file system is a union mount in a virtual file system of the computing device.

5. The method of claim 1, wherein the unioning module is part of a kernel of the computing device.

6. The method of claim 1, wherein flagging the directory entries from the lower level file system as fall-through entries further comprises pointing to a reserved inode number for each copied entry from the lower level file system.

7. The method of claim 1, wherein flagging the directory entries from the lower level file system as fall-through entries further comprises allocating an inode for each copied entry from the lower level file system and marking the allocated inode with a new S_LOOKOVERTHERE inode attribute.

8. The method of claim 1, wherein flagging the directory entries from the lower level file system as fall-through entries further comprises creating a symlink to a reserved target for each copied entry from the lower level file system.

9. A system, comprising:
   a processing device;
   a memory communicably coupled to the processing device;
   a disk storage communicably coupled to the processing device and memory; and
   a unioning module communicably coupled to the processing device, the memory, and the disk storage, the unioning module to union a lower level file system and an upper level file system into a union file system and further configured to:
      receive a request to open a directory of the union file system;
      process a plurality of directory entries in at least one of the lower level file system and the upper level file system that correspond to the directory, the plurality of directory entries processed for whiteouts and duplicates between the lower level file system and the upper level file system;
      write the processed plurality of directory entries to the disk storage, the disk storage dedicated to the union file system and separate from kernel memory and application memory of the system; and
      flag directory entries from the lower level file system that correspond to any of the processed plurality of directory entries written to the disk storage as fall-through entries.

10. The system of claim 9, further comprising marking a copied directory of the upper level file system of the union file system as opaque.

11. The system of claim 9, wherein the union file system is a union mount in a virtual file system of the system.

12. The system of claim 9, wherein the unioning module is part of a kernel of the system.

13. The system of claim 9, wherein flagging any copied entries from the lower level file system as fall-through entries further comprises pointing to a reserved inode number for each copied entry from the lower level file system.

14. The system of claim 9, wherein flagging any copied entries from the lower level file system as fall-through entries further comprises allocating an inode for each copied entry from the lower level file system and marking the allocated inode with a new S_LOOKOVERTHERE inode attribute.

15. The system of claim 9, wherein flagging any copied entries from the lower level file system as fall-through entries further comprises creating a symlink to a reserved target for each copied entry from the lower level file system.

16. A non-transitory machine-readable storage medium including data that, when accessed by a machine, cause the machine to perform operations comprising:
   receiving, by a unioning module, a request to open a directory of a union file system that merges a lower level file system and an upper level file system;
   processing, by the unioning module executable by a computing device, a plurality of directory entries in at least one of the lower level file system and the upper level file system that correspond to the directory, the plurality of directory entries processed for whiteouts and duplicates between the lower level file system and the upper level file system;
   writing, by the unioning module, the processed plurality of directory entries to disk storage for the union file system, the disk storage separate from kernel memory and application memory of the computing device; and
   flagging, by the unioning module, directory entries from the lower level file system that correspond to any of the processed plurality of directory entries written to the disk storage as fall-through entries.

17. The non-transitory machine-readable storage medium of claim 16, wherein the machine-readable storage medium includes data that, when accessed by the machine, cause the machine to perform further operations comprising marking a copied directory of the upper level file system of the union file system as opaque.

18. The non-transitory machine-readable storage medium of claim 16, wherein the union file system is a union mount in a virtual file system of the computing device.

19. The non-transitory machine-readable storage medium of claim 18, wherein the disk storage is the same storage holding the upper level file system of the union file system.

20. The non-transitory machine-readable storage medium of claim 16, wherein flagging any copied entries from the lower level file system as fall-through entries further comprises at least one of pointing to a reserved inode number for each copied entry from the lower level file system, allocating an inode for each copied entry from the lower level file system and marking the allocated inode with a new S_LOOKOVER-THERE inode attribute, or creating a symlink to a reserved target for each copied entry from the lower level file system.

* * * * *